(12) United States Patent
Kato et al.

(10) Patent No.: US 10,815,363 B2
(45) Date of Patent: Oct. 27, 2020

(54) GLASS FLAKES AND RESIN COMPOSITION

(71) Applicant: Nippon Sheet Glass Company, Limited, Tokyo (JP)

(72) Inventors: Shinichi Kato, Mie (JP); Nobuaki Tai, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 100 days.

(21) Appl. No.: 16/303,952

(22) PCT Filed: May 16, 2017

(86) PCT No.: PCT/JP2017/018370
§ 371 (c)(1),
(2) Date: Nov. 21, 2018

(87) PCT Pub. No.: WO2017/204039
PCT Pub. Date: Nov. 30, 2017

(65) Prior Publication Data
US 2020/0017660 A1 Jan. 16, 2020

(30) Foreign Application Priority Data
May 27, 2016 (JP) .................. 2016-106432

(51) Int. Cl.
| | |
|---|---|
| *C08K 9/06* | (2006.01) |
| *C08K 3/40* | (2006.01) |
| *C08K 7/00* | (2006.01) |
| *C08L 67/02* | (2006.01) |
| *C08K 9/04* | (2006.01) |
| *C09D 167/00* | (2006.01) |
| *C03C 11/00* | (2006.01) |
| *C03C 17/32* | (2006.01) |
| *C03C 17/30* | (2006.01) |

(52) U.S. Cl.
CPC ............... *C08K 9/06* (2013.01); *C03C 11/00* (2013.01); *C03C 17/30* (2013.01); *C03C 17/32* (2013.01);
(Continued)

(58) Field of Classification Search
CPC . C08L 67/02; C08L 63/00–10; C09D 167/02; C09D 163/00–10; C09J 167/02;
(Continued)

(56) References Cited

U.S. PATENT DOCUMENTS

| | | |
|---|---|---|
| 3,257,184 A | 6/1966 | Glaser |
| 8,383,531 B2 | 2/2013 | Fujiwara et al. |

(Continued)

FOREIGN PATENT DOCUMENTS

| | | |
|---|---|---|
| CN | 104204023 | 12/2014 |
| JP | S41017148 B | 9/1966 |

(Continued)

OTHER PUBLICATIONS

International Search Report issued for International Patent Application No. PCT/JP2017/018370, dated Jun. 20, 2017, 5 pages including English translation.

(Continued)

*Primary Examiner* — Kregg T Brooks
(74) *Attorney, Agent, or Firm* — Hamre, Schumann, Mueller & Larson, P.C.

(57) ABSTRACT

Glass flakes of the present invention include glass flake substrates and a coating covering at least a portion of the surface of each of the glass flake substrates and composed of a binder. The binder includes a silane coupling agent, an epoxy resin, and a carbodiimide compound as essential components and includes, as an optional component, a crosslinking agent other than a carbodiimide compound. The total amount of the carbodiimide compound and the crosslinking agent is 20 mass % or less with respect to the total mass of the binder.

6 Claims, 2 Drawing Sheets

(52) U.S. Cl.
CPC .............. *C03C 17/326* (2013.01); *C08K 3/40* (2013.01); *C08K 7/00* (2013.01); *C08K 9/04* (2013.01); *C08L 67/02* (2013.01); *C09D 167/00* (2013.01); *C08K 2201/003* (2013.01); *C08K 2201/004* (2013.01); *C08L 2310/00* (2013.01); *C08L 2312/08* (2013.01)

(58) Field of Classification Search
CPC ............ C09J 163/00–10; C08J 2367/02; C08J 2363/00–10; C08J 2463/00–10; C08K 9/04; C08K 9/06; C08K 3/40; C03C 11/00; C03C 17/30; C03C 17/326
See application file for complete search history.

(56) References Cited

U.S. PATENT DOCUMENTS

| | | | |
|---|---|---|---|
| 2009/0088515 A1 | 4/2009 | Yagyu et al. | |
| 2014/0058015 A1* | 2/2014 | Yamada | C08L 67/02 523/435 |
| 2015/0337110 A1 | 11/2015 | Tai | |

FOREIGN PATENT DOCUMENTS

| | | |
|---|---|---|
| JP | S45003541 B | 2/1970 |
| JP | S56161452 A | 12/1981 |
| JP | S5921533 A | 2/1984 |
| JP | S6395260 A | 4/1988 |
| JP | H02124732 A | 5/1990 |
| JP | H02503669 A | 11/1990 |
| JP | H09290482 A | 11/1997 |
| JP | 2006152198 A | 6/2006 |
| JP | 2010270317 A | 12/2010 |
| JP | 2015129073 A | 7/2015 |
| WO | 8808412 A1 | 11/1988 |
| WO | 2006068255 A1 | 6/2006 |
| WO | 2013139732 | 9/2013 |

OTHER PUBLICATIONS

Extended European Search Report issued for European Patent Application No. 17802631.6, dated Jan. 21, 2020, 5 pages.

* cited by examiner

US 10,815,363 B2

GLASS FLAKES AND RESIN COMPOSITION

TECHNICAL FIELD

The present invention relates to glass flakes and a resin composition including the same.

BACKGROUND ART

For resin molded articles, it is commonly known that glass fibers, carbon fibers, mica, glass beads, glass flakes, or the like are incorporated as a filler to a matrix resin to achieve reduction in warping and deformation and/or improvement in mechanical strength. For such a resin molded product, it has been considered preferable to surface-treat the filler with a silane coupling agent or the like to improve the adhesion between the matrix resin and the filler and thereby further enhance the mechanical strength of the resin molded article.

Patent Literature 1, for example, discloses glass flakes as a filler suitable to reduce warping of a molded article obtained from a resin composition containing a thermoplastic resin such as polybutylene terephthalate as a matrix resin and improve the dimensional stability thereof. To the glass flakes is attached a binder including a silane coupling agent and a resin such as an epoxy resin, and the binder provides a firm bond between the thermoplastic resin as the matrix resin and glass flakes.

Patent Literature 2 discloses a resin composition containing a thermoplastic polyester resin such as a polybutylene terephthalate resin as a matrix resin and further containing a filler such as glass flakes. Addition of certain compounds (an epoxy compound and a carbodiimide compound) to the matrix resin enables the resin composition to have excellent mechanical properties and chemical resistance.

CITATION LIST

Patent Literature

Patent Literature 1: JP 2006-152198 A
Patent Literature 2: JP 556(1981)-161452 A

SUMMARY OF INVENTION

Technical Problem

The binder disclosed in Patent Literature 1 as being attached to the filler can improve the adhesion between the filler and matrix resin to some extent and thereby can improve the mechanical strength of resin molded articles including the filler and matrix resin. However, the resultant mechanical strength is still unsatisfactory, and a further improvement has been demanded.

The technique as proposed in Patent Literature 2, in which mechanical properties of resin compositions are enhanced by control of the components of the entire matrix resin, has disadvantages in that the required amount of a component incorporated for adhesion improvement may be undesirably increased or sufficiently high mechanical strength may not be obtained, because of the failure of the component to efficiently exhibit the function of improving the adhesion between the filler and matrix resin at the interface between the filler and matrix resin. Such a matrix resin is a resin composition which is basically intended to function as a matrix resin; therefore, the use of the matrix resin itself as an agent for surface treatment of a filler cannot be expected to provide high effect on improvement in the adhesion between the filler and matrix resin.

It is therefore an object of the present invention to provide glass flakes capable, when used as a filler for reinforcing a resin molded article, of achieving strong adhesion to a matrix resin of the resin molded article and thereby imparting high mechanical strength to the resin molded article. Another object of the present invention is to provide a resin composition in which such glass flakes are incorporated and from which a resin molded article having high mechanical strength can be obtained.

Solution to Problem

The present invention provides glass flakes including:
glass flake substrates; and
a coating covering at least a portion of the surface of each of the glass flake substrates and composed of a binder, wherein
the binder includes a silane coupling agent, an epoxy resin, and a carbodiimide compound as essential components and includes, as an optional component, a crosslinking agent other than a carbodiimide compound, and
the total amount of the carbodiimide compound and the crosslinking agent is 20 mass % or less with respect to the total mass of the binder.

The present invention also provides a resin composition including the glass flakes of the present invention and a matrix resin.

Advantageous Effects of Invention

The glass flakes of the present invention are capable, when used as a filler for reinforcing a resin molded article, of achieving strong adhesion to a matrix resin of the resin molded article and thereby imparting high mechanical strength to the resin molded article. The resin composition of the present invention, which includes such glass flakes of the present invention, can be used to obtain a resin molded article having high mechanical strength.

DESCRIPTION OF EMBODIMENTS

Hereinafter, an embodiment of the present invention will be described specifically.

Glass flakes of the present embodiment include glass flake substrates and a coating covering at least a portion of the surface of each of the glass flake substrates and composed of a binder. The binder includes a silane coupling agent, an epoxy resin, and a carbodiimide compound as essential components and includes, as an optional component, a crosslinking agent other than a carbodiimide compound. That is, the binder may or may not include a crosslinking agent other than a carbodiimide compound. The total amount of the carbodiimide compound and crosslinking agent other than a carbodiimide compound is 20 mass % or less with respect to the total mass of the binder. The above-defined ratio of the total amount of the carbodiimide compound and the crosslinking agent other than a carbodiimide compound with respect to the total mass of the binder is a mass ratio based on solids exclusive of water and solvents. Hereinafter, the glass flake substrates and coating will be described in more detail.

The glass flake substrates used in the glass flakes of the present embodiment can be produced, for example, by a so-called blow process as disclosed in JP S41(1966)-017148 B or JP S45(1970)-003541 B or by a so-called rotary process as disclosed in JP S59(1984)-021533 A or JP H02(1990)-503669 A.

Figure 1:
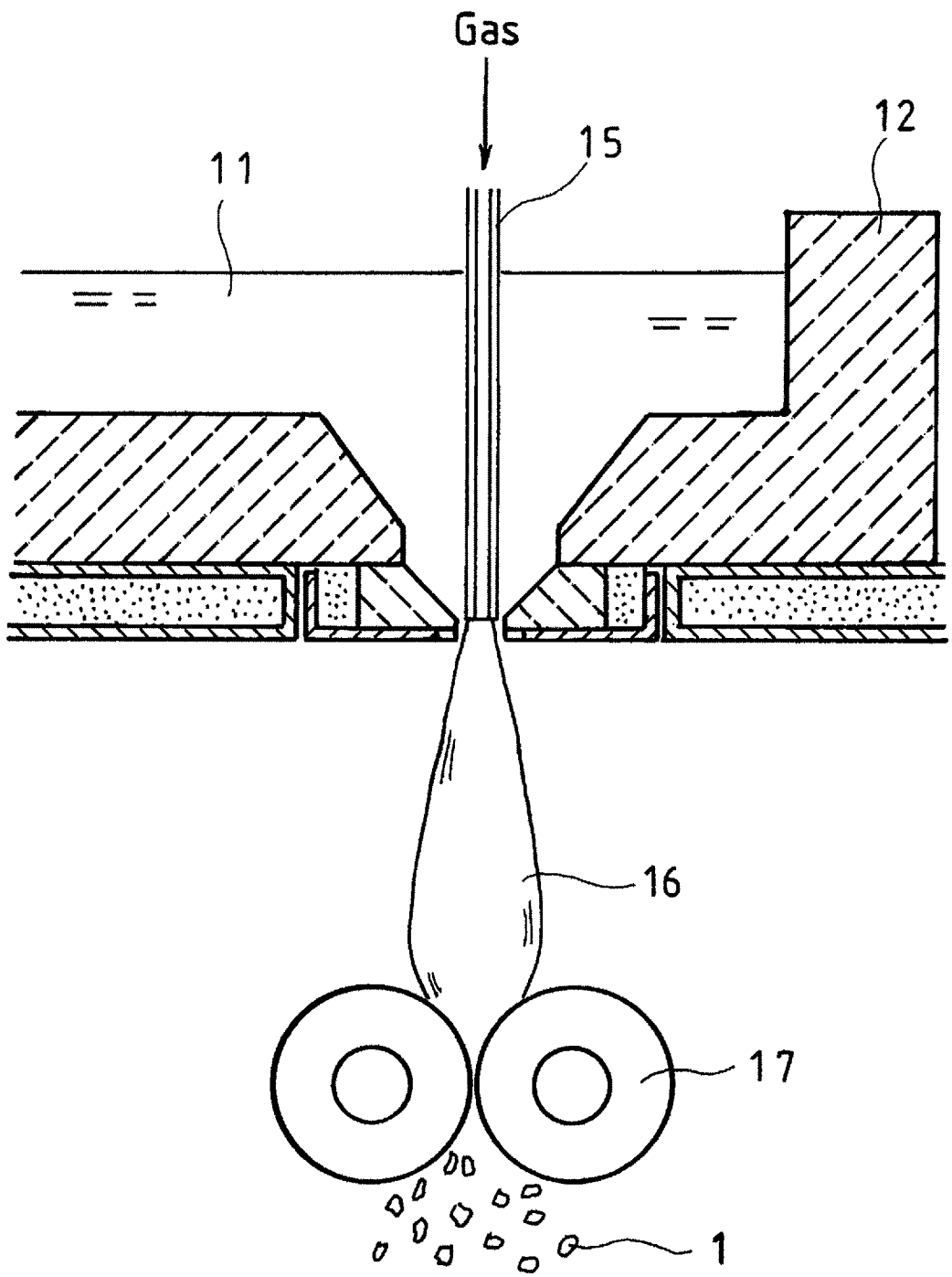
FIG. 1 is a schematic diagram illustrating an example of a production apparatus of glass flake substrates.

For the blow process, a glass production apparatus shown in FIG. 1 can be employed. The glass production apparatus is equipped with a refractory tank furnace 12, blowing nozzle 15, and pressing rolls 17. A glass raw material 11 is melted in the refractory tank furnace 12 (melting furnace) and is inflated into a balloon by a gas delivered through the blowing nozzle 15, so that hollow glass 16 is obtained. The hollow glass 16 is crushed by the pressing rolls 17 to obtain glass flake substrates 1. The thickness of the glass flake substrates 1 can be controlled by adjusting, for example, the speed of pulling the hollow glass 16 and the flow rate of the gas delivered through the blowing nozzle 15.

Figure 2:
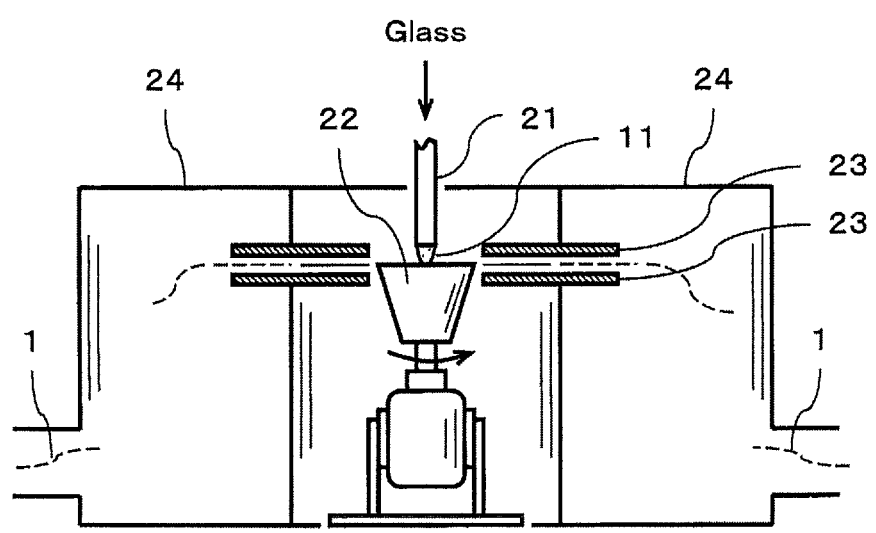
FIG. 2 is a schematic diagram illustrating another example of a production apparatus of glass flake substrates.

For the rotary process, a glass production apparatus shown in FIG. 2 can be employed. The glass production apparatus is equipped with a rotary cup 22, pair of annular plates 23, and annular cyclone collector 24. A molten glass raw material 11 is poured into the rotary cup 22, centrifugally flows out from the upper edge of the rotary cup 22 in a radial manner, and is then drawn and carried into the annular cyclone collector 24 through the gap between the annular plates 23 by airflow. While passing through the annular plates 23, the glass is cooled and solidified into a thin film, which is then crushed into fine pieces to give glass flake substrates 1. The thickness of the glass flake substrates 1 can be controlled by adjusting, for example, the distance between the annular plates 23 and the velocity of the airflow.

Commonly known glass compositions can be used as the composition of the glass flake substrates. Specifically, a glass with a low alkali metal oxide content, such as E-glass, can be suitably used. A typical composition of E-glass is shown below. In the composition, the unit is mass %.

$SiO_2$: 52 to 56
$Al_2O_3$: 12 to 16
CaO: 16 to 25
MgO: 0 to 6
$Na_2O+K_2O$: 0 to 2 (preferably 0 to 0.8)
$B_2O_3$: 5 to 13
$F_2$: 0 to 0.5

For the glass with a low alkali metal oxide content, a glass composition including the following components in mass % and substantially free of $B_2O_3$, F, ZnO, BaO, SrO, and $ZrO_2$ can be employed:

$59 \leq SiO_2 \leq 65$,
$8 \leq Al_2O_3 \leq 15$,
$47 \leq (SiO_2-Al_2O_3) \leq 57$,
$1 \leq MgO \leq 5$,
$20 \leq CaO \leq 30$,
$0 < (Li_2O+Na_2O+K_2O) < 2$, and
$0 \leq TiO_2 \leq 5$.

This glass composition is disclosed by the present applicant in WO 2006/068255 A1.

Being "substantially free" means that the components are not intentionally included except for those inevitably introduced from, for example, industrial materials. Specifically, being "substantially free" means that the content of each of $B_2O_3$, F, ZnO, BaO, SrO, and $ZrO_2$ is less than 0.1 mass % (preferably less than 0.05 mass % and more preferably less than 0.03 mass %).

The average thickness and average particle diameter of the glass flake substrates are not particularly limited. The thinner the glass flake substrates are, the larger the aspect ratio (a value calculated by dividing the average particle diameter by the average thickness) of the glass flake substrates is, and thus the higher the blocking effect against penetration of water or gas into a resin composition filled with the glass flakes is, but the lower the workability is. The average thickness and average particle diameter can be determined in view of the balance among, for example, the blocking effect, reinforcing effect on resin molded articles, workability, degree of technical difficulty, and product cost effectiveness. Specifically, the use of glass flake substrates with an average thickness of 10 µm or less and an aspect ratio of 50 or more for production of the glass flakes is preferred to ensure a good balance among the blocking effect, reinforcing effect on resin molded articles, workability, and product cost effectiveness. In view of the degree of technical difficulty and product cost effectiveness, the average thickness is preferably 0.1 µm or more. To more effectively achieve the reinforcing effect on resin molded articles, the average particle diameter is preferably 10 to 2000 µm. The average aspect ratio is preferably 2000 or less in view of the dispersibility in resins. In the present specification, the average thickness of the glass flake substrates is a value determined by extracting 100 or more glass flake substrates, measuring the thickness thereof with a scanning electron microscope (SEM), and dividing the sum of the thickness values by the number of the glass flake substrates. The average particle diameter is a particle diameter (D50) at a cumulative mass percentage of 50% in a particle size distribution measured by a laser diffraction-scattering method.

As previously described, the binder forming the coating includes a silane coupling agent, epoxy resin, and carbodiimide compound as essential components.

Examples of the silane coupling agent include Y-aminopropyltriethoxysilane, Y-aminopropyltrimethoxysilane, Y-ureidopropyltriethoxysilane, Y-glycidoxypropyltrimethoxysilane, vinyltriethoxysilane, and Y-methacryloxypropyltrimethoxysilane. In addition to the silane coupling agent, for example, a titanium coupling agent, aluminum coupling agent, or zirconia coupling agent can also be used.

Examples of the epoxy resin include, but are not particularly limited to, bisphenol A epoxy resins, phenol novolac epoxy resins, and cresol novolac epoxy resins.

The carbodiimide compound functions as a crosslinking agent. An aromatic polycarbodiimide compound or aliphatic polycarbodiimide compound having a basic structure represented by the following formula (1) can be used as the carbodiimide compound. Suitably used is, but not particularly limited to, the aliphatic polycarbodiimide compound.

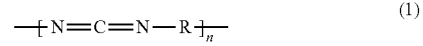

(1)

wherein n represents an integer of 2 or larger and R represents an aromatic group or aliphatic group.

The aliphatic polycarbodiimide can be synthesized by a decarboxylative condensation reaction of a diisocyanate in the presence of a carbodiimidization catalyst. Examples of the diisocyanate used for the synthesis of the aliphatic polycarbodiimide include hexamethylene diisocyanate, 4,4'-dicyclohexylmethane diisocyanate, cyclohexane-1,4-diisocyanate, isophorone diisocyanate, and methylcyclohexane diisocyanate. The aliphatic polycarbodiimide can be used to synthesize one diisocyanate or two or more diisocyanates selected from these diisocyanates. Among these diisocyanates, 4,4'-dicyclohexylmethane diisocyanate is preferred.

The binder may include, as an optional component, a crosslinking agent (hereinafter referred to as a "crosslinking agent (A)") other than a carbodiimide compound. As previously described, the total amount of the carbodiimide compound and crosslinking agent (A) is 20 mass % or less and preferably 15 mass % or less with respect to the total mass of the binder. If a resin molded article is reinforced with glass flakes including a coating composed of a binder in which the total amount of the carbodiimide compound and crosslinking agent (A) is more than 20 mass %, the mechanical strength of the resin molded article cannot be improved significantly. The ratio of the carbodiimide compound is preferably 3 mass % or more with respect to the total mass of the binder, regardless of whether the crosslinking agent (A) is included.

The crosslinking agent (A) may include, for example, at least one selected from the group consisting of a butadiene-maleic anhydride copolymer, an itaconic acid-maleic anhydride copolymer, an ethylene-maleic anhydride copolymer, and a styrene-maleic anhydride copolymer.

In the binder, the ratio of the silane coupling agent to the total of the epoxy resin and carbodiimide compound (silane coupling agent:epoxy resin+carbodiimide compound), as expressed by a mass ratio based on solids exclusive of water and solvents, is, for example, 1:99 to 90:10, preferably 10:90 to 80:20, and more preferably 35:65 to 60:40.

In the binder, the ratio of the epoxy resin to the carbodiimide compound (epoxy resin:carbodiimide compound), as expressed by a mass ratio based on solids exclusive of water and solvents, is, for example, 30:70 to 99:1, preferably 50:50 to 95:5, and more preferably 65:35 to 90:10.

As previously described, the carbodiimide compound functions as a crosslinking agent. Therefore, when the crosslinking agent (A) is added to the binder, the preferred ratio of the crosslinking agent (A) is determined in terms of the total amount of the carbodiimide compound and crosslinking agent (A). When the binder includes the crosslinking agent (A), the ratio of the silane coupling agent to the total of the epoxy resin, carbodiimide compound, and crosslinking agent (A) (silane coupling agent:epoxy resin+carbodiimide compound+crosslinking agent (A)), as expressed by a mass ratio based on solids exclusive of water and solvents, is adjusted to, for example, 1:99 to 90:10, preferably 10:90 to 80:20, or more preferably 35:65 to 60:40. The ratio of the epoxy resin to the total of the carbodiimide compound and crosslinking agent (A) (epoxy resin:carbodiimide compound+crosslinking agent (A)), as expressed by a mass ratio based on solids exclusive of water and solvents, is adjusted to, for example, 30:70 to 99:1, preferably 50:50 to 95:5, more preferably 65:35 to 90:10.

The binder may include a component in addition to the silane coupling agent, epoxy resin, carbodiimide compound, and crosslinking agent (A), if necessary. For example, the binder may further include such other components as a urethane resin, surfactant, and/or anti-foaming agent, if necessary.

A method for producing the binder is not particularly limited. For example, a binder solution can be produced by uniformly dispersing a resin in water with the aid of an emulsifier or the like and then mixing the resultant dispersion with a hydrolyzed silane coupling agent and a carbodiimide compound. Alternatively, a binder solution may be produced by adding the epoxy resin, silane coupling agent, carbodiimide compound, etc. to an organic solvent as appropriate at ordinary temperature and atmospheric pressure and then stirring the mixture to homogeneity.

In the present embodiment, for example, the binder solution is added to the glass flake substrates, which are stirred and then dried to form a coating covering at least a portion of the surface of each of the glass flake substrates. The method for accomplishing the addition of the binder solution, stirring, and drying is not limited to specific ones. Examples of the method will be described hereinafter.

For example, the glass flake substrates are fluidized in a mixer such as a rotary disk mixer or Henschel mixer having a mixing vessel equipped with a rotating blade, a predetermined amount of the binder is added to the flowing glass flake substrates by a means such as a spray, and the glass flake substrates and binder are mixed and stirred. Then, the glass flake substrates are dried under stirring in the mixer, or the glass flake substrates are taken out of the mixer and dried. In this manner, glass flakes provided with a coating can be obtained.

In another example, the glass flakes can be produced by tumbling granulation as described in JP H02(1990)-124732 A. That is, the glass flakes can be produced by placing the glass flake substrates in a horizontal oscillating granulator equipped with a stirring blade, spraying the binder solution onto the glass flake substrates, and performing granulation.

The glass flakes can be produced also by using known methods other than the above examples, such as those generally called stirring granulation, fluidized bed granulation, injection granulation, and rotary granulation.

The drying step is accomplished, for example, by heating the glass flake substrates to a temperature equal to or higher than the boiling point of the solvent used in the binder solution and drying the glass flake substrates until the solvent fully evaporates.

The proportion of the coating in the glass flakes can be controlled by adjusting the concentration of the binder in the binder solution to be added or sprayed. That is, the glass flakes having a predetermined proportion of the coating composed of the binder can be produced by adding or spraying a predetermined amount of the binder solution onto a predetermined amount of the glass flake substrates so that a predetermined amount of the binder is deposited on the glass flake substrates.

The proportion of the coating in the glass flakes is preferably 0.05 to 1.5 mass % and more preferably 0.1 to 0.8 mass %. If the proportion of the coating is less than 0.05 mass %, covering of the glass flake substrates by the binder may be insufficient, and the insufficient covering can cause a decrease in the strength of the resultant resin molded article. If the proportion of the coating is more than 1.5 mass %, the excess binder may cause problems such as a decrease in the strength of the resultant resin molded article or generation of a gas at the time of compounding.

Next, a resin composition of the present embodiment will be described.

The resin composition of the present embodiment includes the above-described glass flakes of the present embodiment and a matrix resin.

The matrix resin is not particularly limited, and examples thereof include: polyolefins such as polybutylene, polypropylene, and polyethylene; polyesters such as thermoplastic polyester resins such as polybutylene terephthalate; polycarbonate; polyvinyl chloride; polystyrene; polyamide; copolymers thereof; polyphenylene sulfide; polyphenylene ether; polyetheretherketone; and liquid crystal polymers (types I, II, and III). The glass flakes of the present embodiment can exhibit high reinforcing effect on a resin molded article especially when a thermoplastic polyester resin is used as the matrix resin. The glass flakes of the present embodiment can exhibit higher reinforcing effect especially when the thermoplastic polyester resin used is polybutylene terephthalate.

The content of the glass flakes in the resin composition is preferably 5 to 70 mass %. Controlling the content to 5 mass % or more allows the glass flakes to fully exhibit their function as a reinforcing material. Controlling the content to 70 mass % or less makes it possible to uniformly disperse the glass flakes in the resin composition. To further reduce the mold shrinkage factor, the content of the glass flakes is more preferably 30 mass % or more and 60 mass % or less.

The resin composition may, depending on its intended use, contain a reinforcing material other than the glass flakes, such as glass fibers. For example, when the resin composition is used for a part of an electric or electronic device, the resin composition may contain glass fibers in an amount comparable to that of the glass flakes since such a part needs to have very high strength.

Owing to the reinforcing effect of the glass flakes, a resin molded article produced using the resin composition of the present embodiment can have high tensile strength and high flexural strength. Additionally, since the mold shrinkage factor of the resin composition of the present embodiment is low, a resin molded article having high dimensional stability can be obtained using the resin composition. Furthermore, since the glass flakes included in the resin composition of the present embodiment have a smaller average thickness than glass flakes contained in conventional resin compositions, a molded article having a smooth surface with small surface roughness can be obtained using the resin composition of the present embodiment.

EXAMPLES

Hereinafter, the embodiment of the present invention will be described more specifically by way of Examples and Comparative Examples.

Example 1

(Glass flakes)

First, glass flake substrates were produced using E-glass having a composition shown in Table 1 by the blow process previously described with reference to FIG. 1. Specifically, the E-glass was placed and melted in a melting furnace heated to 1200° C. or higher. Air was blown from a nozzle to form thin glass, which was continuously pulled out by rollers. The amount of the blown air and the rotation speed of the rollers were adjusted to obtain glass having an average thickness of 0.7 μm. Afterwards, the thin glass was crushed and then classified to obtain glass flake substrates having an average particle diameter of 160 μm. Glass flake substrates with a uniform size can be obtained by crushing into glass flake substrates, followed by classification of the glass flake substrates by means of a sieve having an appropriate opening size.

TABLE 1

| | (Unit: mass %) E-glass |
|---|---|
| $SiO_2$ | 54.7 |
| $Al_2O_3$ | 14.0 |

TABLE 1-continued

| | (Unit: mass %) E-glass |
|---|---|
| CaO | 23.4 |
| MgO | 0.3 |
| $Na_2O$ | 0.4 |
| $K_2O$ | 0.2 |
| $B_2O_3$ | 5.8 |
| Others | 1.2 |

Next, 5 kg of the glass flake substrates were placed in a Henschel mixer. While a binder solution was being added by spraying, the contents of the mixer were mixed and stirred for 15 minutes. The binder (solid) contained in the binder solution included: Y-aminopropyltriethoxysilane as a silane coupling agent; a phenol novolac epoxy resin (Epolsion EA10 manufactured by Henkel Japan Ltd.); and a carbodiimide compound (CARBODILITE V-02-L2 manufactured by Nisshinbo Chemical Inc.). In the binder of the binder solution, the content of the silane coupling agent was 40 mass %, the content of the epoxy resin was 47.5 mass %, and the content of the carbodiimide compound was 12.5 mass %. The solvent used in the binder solution was water. After the mixing and stirring, the glass flakes (undried) were taken out of the mixer and dried by a dryer at 125° C. for 8 hours. Glass flakes of Example 1 were thus obtained.

The proportion of the deposited binder in the obtained glass flakes was examined by loss on ignition. Specifically, a proper amount of the glass flakes was dried at 110° C., and then heated in an atmosphere at 625° C. to remove the binder from the surface of the glass flakes. The proportion of the deposited binder in the glass flakes was calculated from the difference between the mass of the glass flakes before the heating and the mass of the glass flakes after the heating. The result is shown in Table 2.

(Resin Molded Article)

The glass flakes of Example 1 and polybutylene terephthalate (DURANEX 2000 manufactured by WinTech Polymer Ltd.) were kneaded by an extrusion molding machine (KZW 15-30 MG manufactured by Technovel Corporation, molding temperature: about 250 to 260° C.) to obtain a resin composition containing polybutylene terephthalate as a matrix resin and glass flakes as a reinforcing filler. This resin composition was molded by an injection molding machine (HM7 manufactured by NISSEI PLASTIC INDUSTRIAL CO., LTD.) to obtain a resin molded article. The content of the glass flakes in the obtained resin molded article was 30 mass %.

Additionally, properties of the resin molded article were examined. The maximum tensile strength was measured according to JIS K 7113. The maximum flexural strength and the flexural modulus were measured according to JIS K 7171. The Izod impact strength was measured according to JIS K 7111-1. The measurement results are shown in Table 2. The term "moist heating" in Table 2 is used to mean that the strength of the specimen was measured after exposure to conditions of 85° C. and 85RH % for the indicated days.

Examples 2 to 8

Glass flakes of Examples 2 to 8 were prepared in the same manner as in Example 1, except for changing the contents of the silane coupling agent, epoxy resin, and carbodiimide compound in the binder contained in the binder solution as shown in Table 2. The proportion of the coating in the obtained glass flakes was measured in the same manner as in Example 1. Additionally, resin molded articles were prepared and the properties thereof were measured in the same manner as in Example 1. The results are shown in Table 2.

Examples 9 and 10

Glass flakes of Examples 9 and 10 were prepared in the same manner as in Example 1, except for further adding a butadiene-maleic anhydride copolymer functioning as a crosslinking agent to the binder solution and changing the contents of the silane coupling agent, epoxy resin, carbodiimide compound, and butadiene-maleic anhydride copolymer as shown in Table 2. The proportion of the coating in the obtained glass flakes was measured in the same manner as in Example 1. Additionally, resin molded articles were also prepared and the properties thereof were measured in the same manner as in Example 1. The results are shown in Table 2.

Comparative Examples 1 and 2

Glass flakes of Comparative Examples 1 and 2 were prepared in the same manner as in Example 1, except for not adding any carbodiimide compound to the binder solution and changing the contents of the silane coupling agent and epoxy resin in the binder solution as shown in Table 3. That is, the binders for forming the coatings of Comparative Examples 1 and 2 consisted only of the silane coupling agent and epoxy resin and did not include any carbodiimide compound. The proportion of the coating in the obtained glass flakes was measured in the same manner as in Example 1. Additionally, resin molded articles were also prepared and the properties thereof were measured in the same manner as in Example 1. The results are shown in Table 3.

Comparative Example 3

Glass flakes of Comparative Example 3 were prepared in the same manner as in Example 1, except for changing the contents of the silane coupling agent, epoxy resin, and carbodiimide compound in the binder contained in the binder solution as shown in Table 3. In the binder for forming the coating of Comparative Example 3, the content of the carbodiimide compound was 25 mass %, i.e., more than 20 mass %. The proportion of the coating in the obtained glass flakes was measured in the same manner as in Example 1. Additionally, a resin molded article was also prepared and the properties thereof were measured in the same manner as in Example 1. The results are shown in Table 3.

Comparative Example 4

Glass flakes of Comparative Example 4 were prepared in the same manner as in Example 1, except for further adding a butadiene-maleic anhydride copolymer functioning as a crosslinking agent to the binder solution and changing the contents of the silane coupling agent, epoxy resin, carbodiimide compound, and butadiene-maleic anhydride copolymer as shown in Table 3. In the binder for forming the coating of Comparative Example 4, the total content of the carbodiimide compound and butadiene-maleic anhydride copolymer (crosslinking agent (A)) was 25 mass %, i.e., more than 20 mass %. The proportion of the coating in the obtained glass flakes was measured in the same manner as in Example 1. Additionally, a resin molded article was also prepared and the properties thereof were measured in the same manner as in Example 1. The results are shown in Table 3.

As shown in Tables 2 and 3, while basic strength levels were different depending on the ratio of the silane coupling agent component, the mechanical strength of the resin molded articles of Examples 1 to 10 was relatively high compared to the mechanical strength of the resin molded articles of Comparative Examples 1 and 2 in which the coatings in the glass flakes did not include any carbodiimide compound, the resin molded article of Comparative Example 3 in which the binder for forming the coating in the glass flakes included more than 20 mass % of the carbodiimide compound, and the resin molded article of Comparative Example 4 in which the binder for forming the coating in the glass flakes included more than 20 mass % of the carbodiimide compound and crosslinking agent (A) in total. The content of the glass flakes in the resin molded article was the same (30 mass %) for all of Examples and Comparative Examples. Therefore, it can be concluded that the inclusion of a carbodiimide compound into a binder for forming a coating and the total amount of crosslinking agents (the total amount of a carbodiimide compound and crosslinking agent (A)) correlate with the strength of a resin including polybutylene terephthalate.

TABLE 2

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Binder | Proportion of coating | (mass %) | 0.5 | 0.5 | 0.5 | 0.5 | 0.5 | 0.5 | 0.5 | 0.5 | 0.5 | 0.5 |
| | Content of silane coupling agent | (mass %) | 40 | 60 | 50 | 30 | 20 | 10 | 50 | 50 | 50 | 50 |
| | Content of epoxy resin | (mass %) | 47.5 | 27.5 | 37.5 | 57.5 | 67.5 | 77.5 | 43.75 | 31.25 | 43.75 | 37.5 |
| | Content of carbodiimide compound | (mass %) | 12.5 | 12.5 | 12.5 | 12.5 | 12.5 | 12.5 | 6.25 | 18.75 | 3.125 | 6.25 |
| | Content of butadiene-maleic anhydride copolymer | (mass %) | 0 | 0 | 0 | 0 | 0 | 0 | 0 | 0 | 3.125 | 6.25 |
| Properties of molded article | Maximum tensile strength-Initial state | (MPa) | 85.4 | 83.2 | 84.3 | 84.2 | 82.9 | 82.8 | 83.3 | 83.2 | 83.2 | 85.7 |
| | Maximum tensile strength-Moist heating (2 days) | (MPa) | 73.6 | 71.9 | 72.1 | 72.6 | 70.9 | 70.6 | 70.6 | 70.7 | 70.4 | 72.9 |

TABLE 2-continued

|  |  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
|  | Maximum tensile strength-Moist heating (7 days) | (MPa) | 67.0 | 66.0 | 66.4 | 66.2 | 66.4 | 66.1 | 66.0 | 66.0 | 66.0 | 69.1 |
|  | Maximum flexural strength- Initial state | (MPa) | 156.3 | 147.9 | 150.6 | 152.3 | 150.2 | 149.7 | 148.1 | 147.9 | 148.0 | 151.8 |
|  | Flexural modulus-Initial state | (MPa) | 7738 | 7166 | 7310 | 7539 | 7322 | 7281 | 7201 | 7166 | 7232 | 7434 |
|  | Maximum flexural strength-Moist heating (2 days) | (MPa) | 132.1 | 130.0 | 131.1 | 130.4 | 130.0 | 129.8 | 130.3 | 129.9 | 129.9 | 136.1 |
|  | Flexural modulus-Moist heating (2 days) | (MPa) | 6605 | 6066 | 6117 | 6385 | 6163 | 6080 | 6106 | 6088 | 6087 | 6367 |
|  | Maximum flexural strength-Moist heating (7 days) | (MPa) | 129.6 | 125.5 | 128.3 | 127.5 | 127.1 | 126.5 | 126.7 | 126.0 | 125.7 | 132.3 |
|  | Flexural modulus-Moist heating (7 days) | (MPa) | 6048 | 5636 | 5902 | 5766 | 5722 | 5611 | 5675 | 5599 | 5636 | 5987 |
|  | Izod impact strength N[*2] | (kJ/m$^2$) | 3.4 | 3.0 | 3.3 | 3.3 | 3.0 | 3.0 | 3.1 | 3.0 | 3.0 | 3.2 |
|  | Izod impact strength UN[*1] | (kJ/m$^2$) | 41.3 | 39.0 | 40.7 | 41.3 | 39.1 | 39.0 | 40.2 | 39.0 | 39.7 | 41.6 |

Notes
[*1]Un-notched
[*2]Notched

TABLE 3

|  |  |  | Comparative Example 1 | Comparative Example 2 | Comparative Example 3 | Comparative Example 4 |
|---|---|---|---|---|---|---|
| Binder | Proportion of coating | (mass %) | 0.5 | 0.5 | 0.5 | 0.5 |
|  | Content of silane coupling agent | (mass %) | 50 | 10 | 50 | 42.9 |
|  | Content of epoxy resin | (mass %) | 50 | 90 | 25 | 32.1 |
|  | Content of carbodiimide compound | (mass %) | 0 | 0 | 25 | 12.5 |
|  | Content of butadiene-maleic anhydride copolymer | (mass %) | 0 | 0 | 0 | 12.5 |
| Properties of molded article | Maximum tensile strength-Initial state | (MPa) | 80.9 | 82.8 | 79.7 | 79.8 |
|  | Maximum tensile strength-Moist heating (2 days) | (MPa) | 70.4 | 70.1 | 68.1 | 66.2 |
|  | Maximum tensile strength-Moist heating (7 days) | (MPa) | 66.0 | 65.1 | 64.1 | 64.3 |
|  | Maximum flexural strength- Initial state | (MPa) | 147.9 | 147.6 | 143.1 | 143.3 |
|  | Flexural modulus-Initial state | (MPa) | 7132 | 7139 | 6932 | 6979 |
|  | Maximum flexural strength-Moist heating (2 days) | (MPa) | 129.7 | 127.4 | 122.8 | 124.6 |
|  | Flexural modulus-Moist heating (2 days) | (MPa) | 6050 | 5439 | 5211 | 5326 |
|  | Maximum flexural strength-Moist heating (7 days) | (MPa) | 125.3 | 122.1 | 119.0 | 121.3 |
|  | Flexural modulus-Moist heating (7 days) | (MPa) | 5585 | 5497 | 5208 | 5413 |

TABLE 3-continued

|  |  | Comparative Example 1 | Comparative Example 2 | Comparative Example 3 | Comparative Example 4 |
|---|---|---|---|---|---|
| Izod impact strength N*2 | (kJ/m$^2$) | 3.0 | 2.6 | 2.0 | 2.2 |
| Izod impact strength UN*1 | (kJ/m$^2$) | 38.9 | 34.9 | 29.7 | 30.5 |

Notes
*1 Un-notched
*2 Notched

INDUSTRIAL APPLICABILITY

The glass flakes of the present invention are capable of effectively reinforcing resin molded articles as well as being effective in reducing warping and shrinkability of the resin molded articles, and are therefore applicable to various uses. For example, a resin composition including the glass flakes of the present invention and polybutylene terephthalate can be suitably used, for example, in the field of automobiles and in the field of electronic parts.

The invention claimed is:

1. Glass flakes comprising:
glass flake substrates; and
a coating covering at least a portion of the surface of each of the glass flake substrates and composed of a binder, wherein
the binder comprises a silane coupling agent, an epoxy resin, and a carbodiimide compound as essential components and comprises, as an optional component, a crosslinking agent other than a carbodiimide compound,
the total amount of the carbodiimide compound and the crosslinking agent is 20 mass % or less with respect to the total mass of the binder, and
the proportion of the coating in the glass flakes is 0.05 to 1.5 mass %.

2. The glass flakes according to claim 1, wherein the crosslinking agent comprises at least one selected from the group consisting of a butadiene-maleic anhydride copolymer, an itaconic acid-maleic anhydride copolymer, an ethylene-maleic anhydride copolymer, and a styrene-maleic anhydride copolymer.

3. The glass flakes according to claim 1, wherein the glass flake substrates have an average thickness of 0.1 to 10 µm and an average particle diameter of 10 to 2000 µm.

4. A resin composition comprising:
the glass flakes according to claim 1; and
a matrix resin.

5. The resin composition according to claim 4, wherein the matrix resin is a thermoplastic polyester resin.

6. The resin composition according to claim 5, wherein the thermoplastic polyester resin is polybutylene terephthalate.

* * * * *

UNITED STATES PATENT AND TRADEMARK OFFICE
CERTIFICATE OF CORRECTION

PATENT NO. : 10,815,363 B2
APPLICATION NO. : 16/303952
DATED : October 27, 2020
INVENTOR(S) : Kato et al.

Page 1 of 1

It is certified that error appears in the above-identified patent and that said Letters Patent is hereby corrected as shown below:

In the Specification

Column 4, Lines 37-40, delete "Y-aminopropyltriethoxysilane, Y-aminopropyltrimethoxysilane, Y-ureidopropyltriethoxysilane, Y-glycidoxypropyltrimethoxysilane," and insert
-- γ-aminopropyltriethoxysilane, γ-aminopropyltrimethoxysilane, γ-ureidopropyltriethoxysilane, γ-glycidoxypropyltrimethoxysilane, --.

Column 4, Lines 40-41, delete "Y-methacryloxypropyltrimethoxysilane." and insert
-- γ-methacryloxypropyltrimethoxysilane. --.

Column 6, Line 65, delete "thereof," and insert -- thereof; --.

Column 8, Line 16, delete "Y-aminopropyltriethoxysilane" and insert
-- γ-aminopropyltriethoxysilane --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*